(12) United States Patent
Adachi et al.

(10) Patent No.: US 12,436,660 B2
(45) Date of Patent: Oct. 7, 2025

(54) INFORMATION PROCESSING APPARATUS, PROGRAM, AND METHOD

(71) Applicant: Sony Group Corporation, Tokyo (JP)

(72) Inventors: Hiroaki Adachi, Tokyo (JP); Seiji Muramatsu, Tokyo (JP); Kenji Yokoyama, Tokyo (JP); Yukako Murakami, Tokyo (JP); Kazuki Kozuma, Tokyo (JP); Toshiyuki Kimura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/796,263

(22) PCT Filed: Feb. 21, 2020

(86) PCT No.: PCT/JP2020/007265
§ 371 (c)(1),
(2) Date: Jul. 29, 2022

(87) PCT Pub. No.: WO2021/166270
PCT Pub. Date: Aug. 26, 2021

(65) Prior Publication Data
US 2023/0124559 A1   Apr. 20, 2023

(51) Int. Cl.
*G06F 3/0482*   (2013.01)
*G06F 3/0485*   (2022.01)
(Continued)

(52) U.S. Cl.
CPC .......... *G06F 3/0482* (2013.01); *G06F 3/0485* (2013.01); *G06F 3/04817* (2013.01); *G06F 3/04886* (2013.01); *G06F 2203/04803* (2013.01)

(58) Field of Classification Search
CPC .. G06F 3/0482; G06F 3/0485; G06F 3/04817; G06F 3/04886; G06F 2203/04803
See application file for complete search history.

(56) References Cited

U.S. PATENT DOCUMENTS 9,898,155 B2 *   2/2018   Kim ................. G06F 3/0481
2011/0252368 A1 *  10/2011  Anzures ............ G06F 9/451
                                                715/823
(Continued)

FOREIGN PATENT DOCUMENTS

JP   2005-227951 A   8/2005
JP   2014-157466 A   8/2014
(Continued)

OTHER PUBLICATIONS

International Search Report and Written Opinion mailed on Apr. 14, 2020, received for PCT Application PCT/JP2020/007265, filed on Feb. 21, 2020, 10 pages including English Translation.

*Primary Examiner* — Stephen S Hong
*Assistant Examiner* — Darrin Hope
(74) *Attorney, Agent, or Firm* — XSENSUS LLP

(57) ABSTRACT

In a conventional multi-window function, when it is desired to switch an application to another application, only one application can be switched, which lacks usability. Therefore, provided is an information processing apparatus that includes an operation unit configured to detect an operation by a user, and a display unit configured to display a first application list and a second application list in response to detecting a first user operation, display a first application selected in a first window in response to detecting a second user operation for selecting the first application from the first application list, and display a second application selected in a second window in response to detecting a third user operation for selecting the second application from the second application list.

19 Claims, 12 Drawing Sheets

(51) Int. Cl.
*G06F 3/04817* (2022.01)
*G06F 3/04886* (2022.01)

(56) References Cited

U.S. PATENT DOCUMENTS

| | | | |
|---|---|---|---|
| 2013/0305184 A1* | 11/2013 | Kim | G06F 9/451 |
| | | | 715/810 |
| 2014/0137020 A1* | 5/2014 | Sharma | G06F 3/0486 |
| | | | 715/810 |
| 2015/0067588 A1 | 3/2015 | Shim | |
| 2015/0186009 A1 | 7/2015 | Nishimura | |
| 2016/0202852 A1 | 7/2016 | Park | |

FOREIGN PATENT DOCUMENTS

| | | |
|---|---|---|
| JP | 2015-92376 A | 5/2015 |
| JP | 2015-125567 A | 7/2015 |
| JP | 2015-141660 A | 8/2015 |

\* cited by examiner

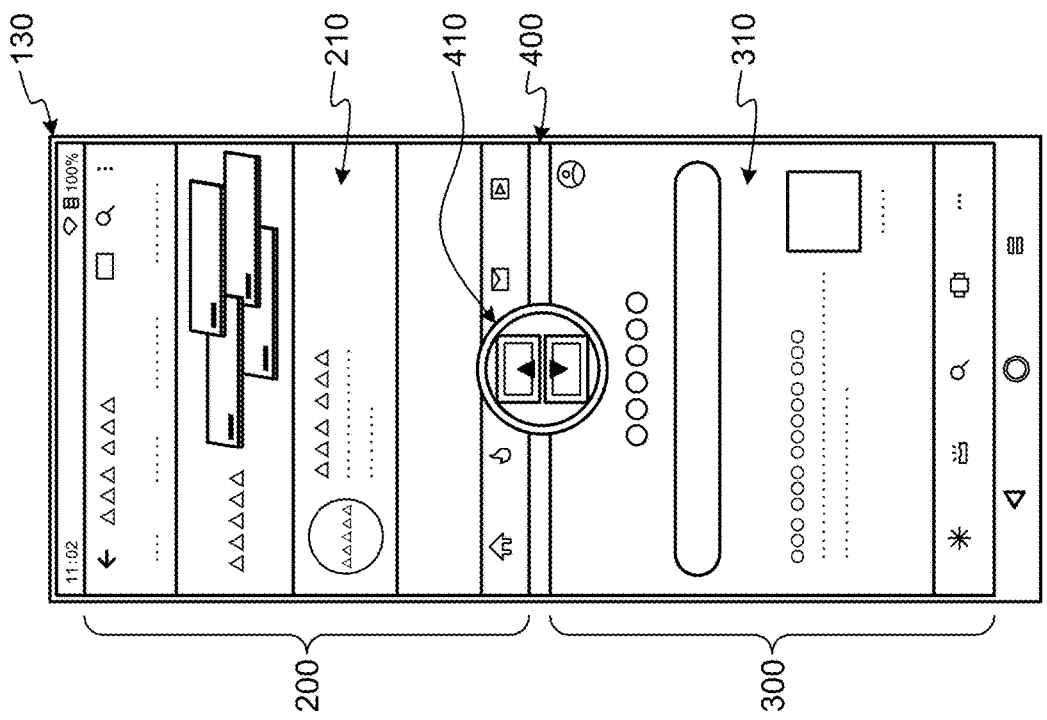
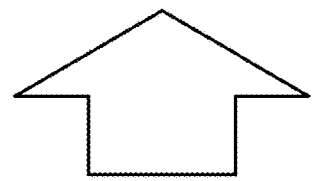
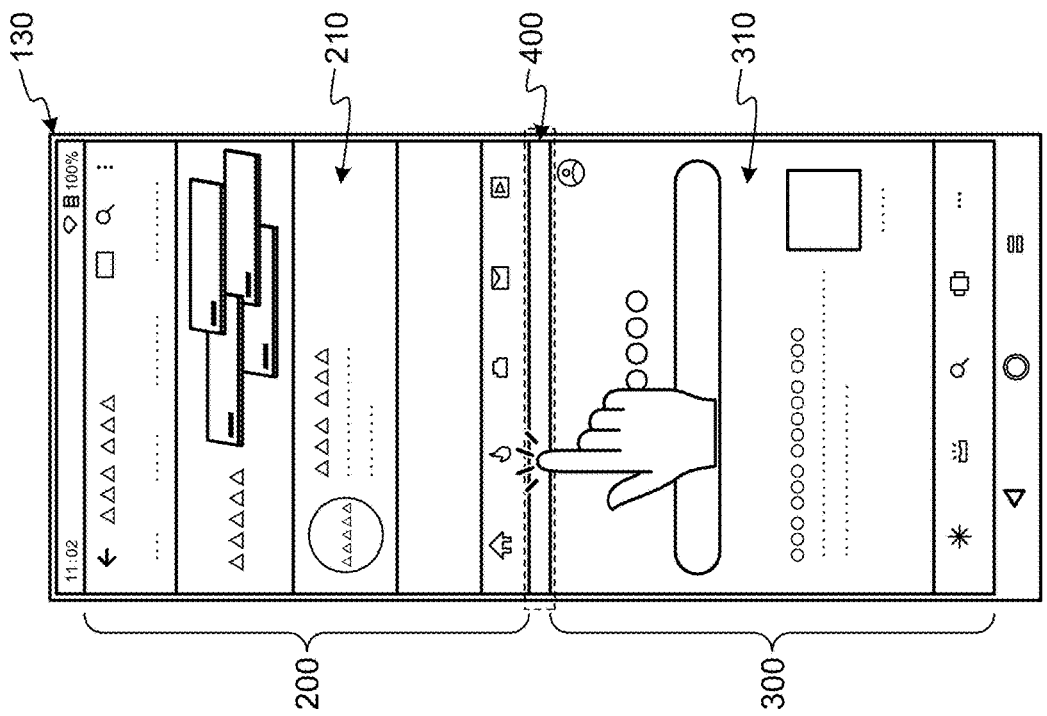
FIG.3

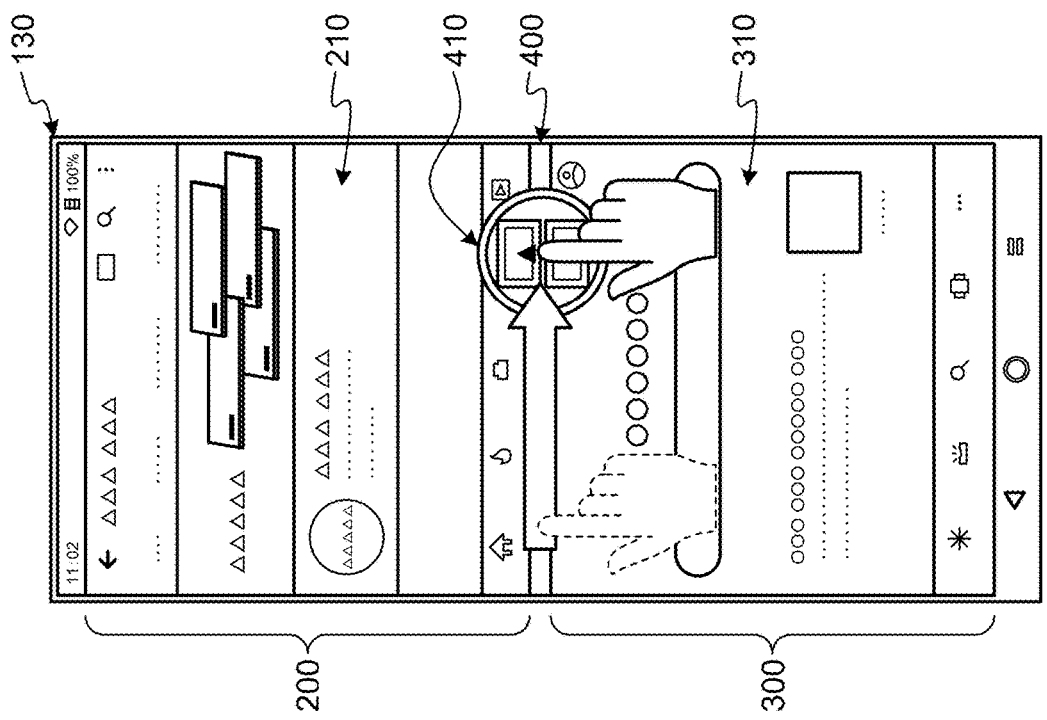
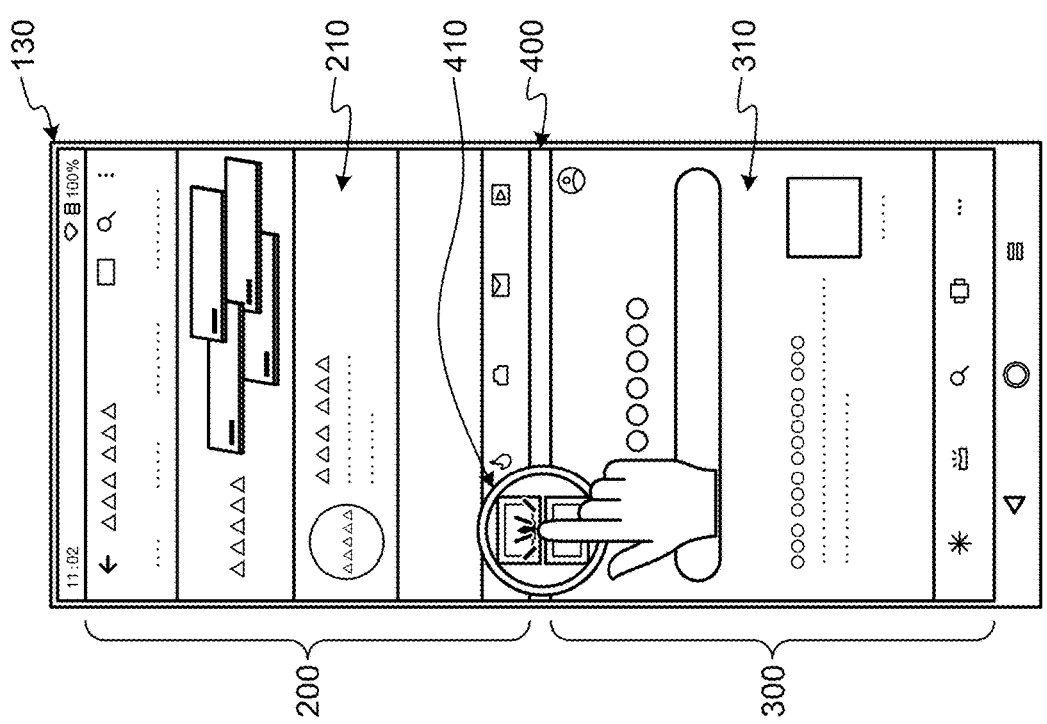
FIG.4

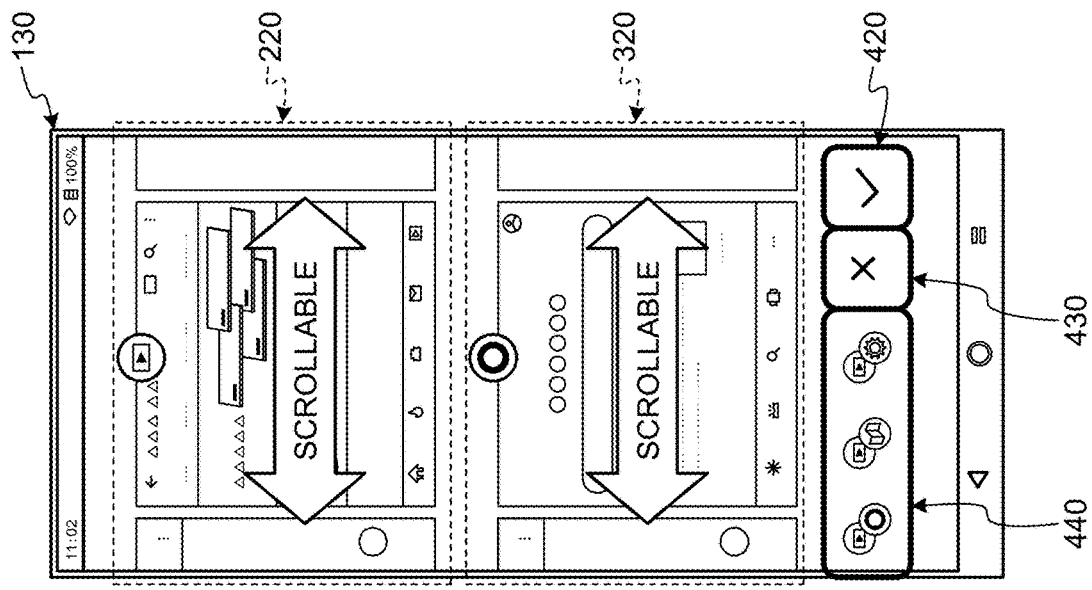
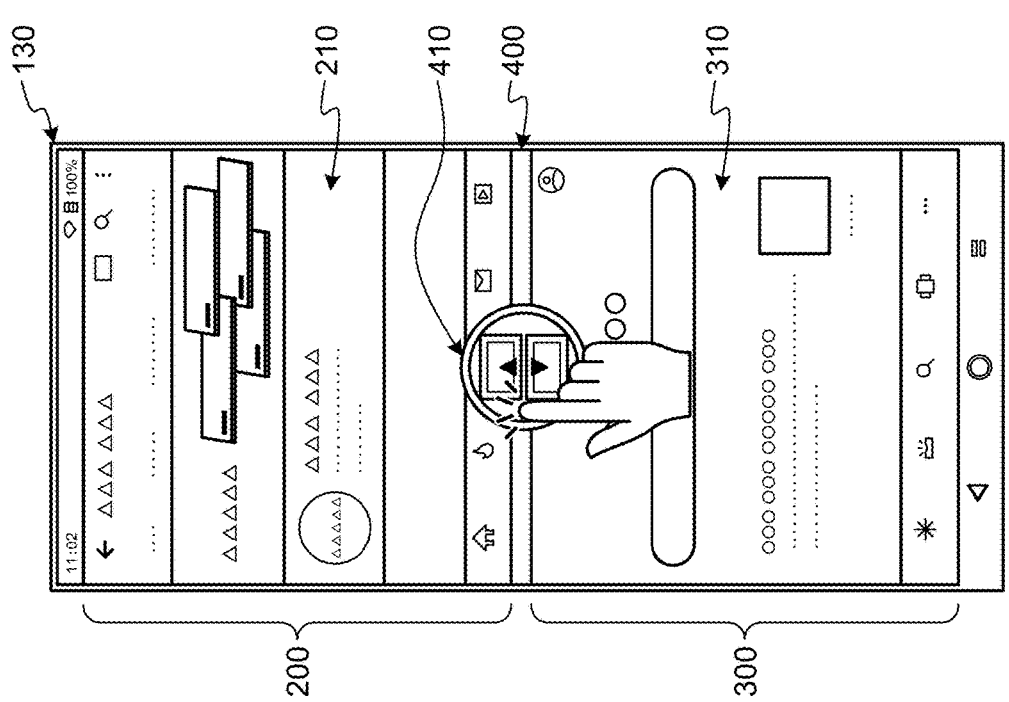
FIG.5

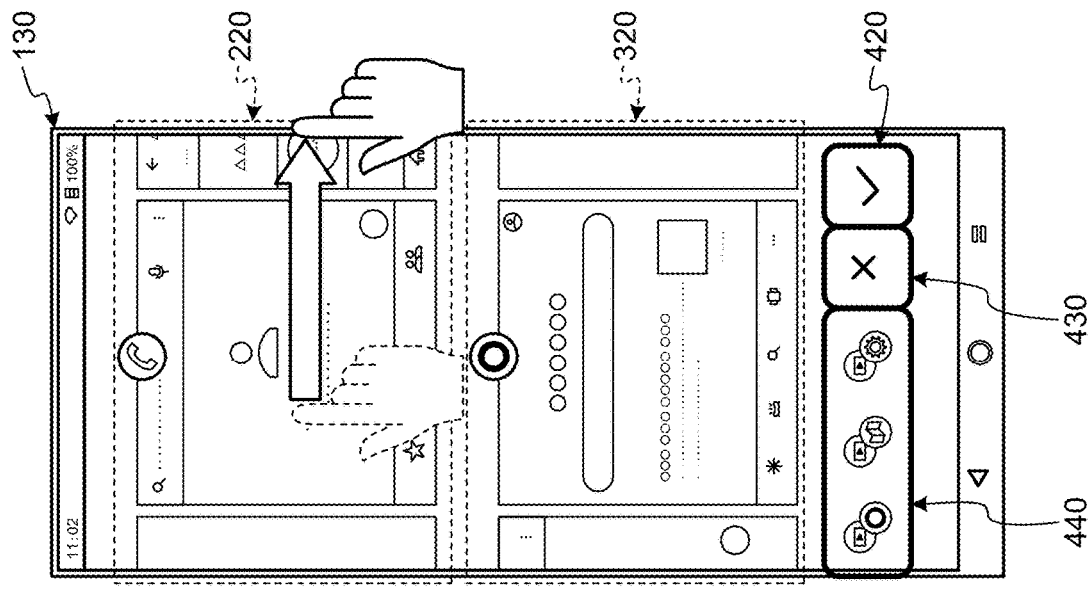
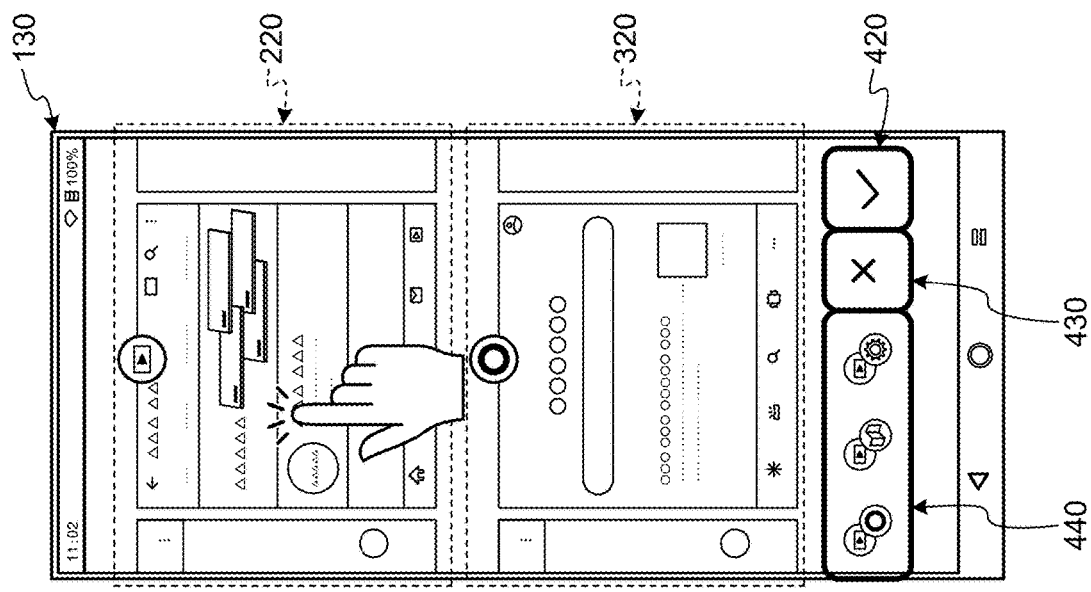
FIG.6

FIG.10
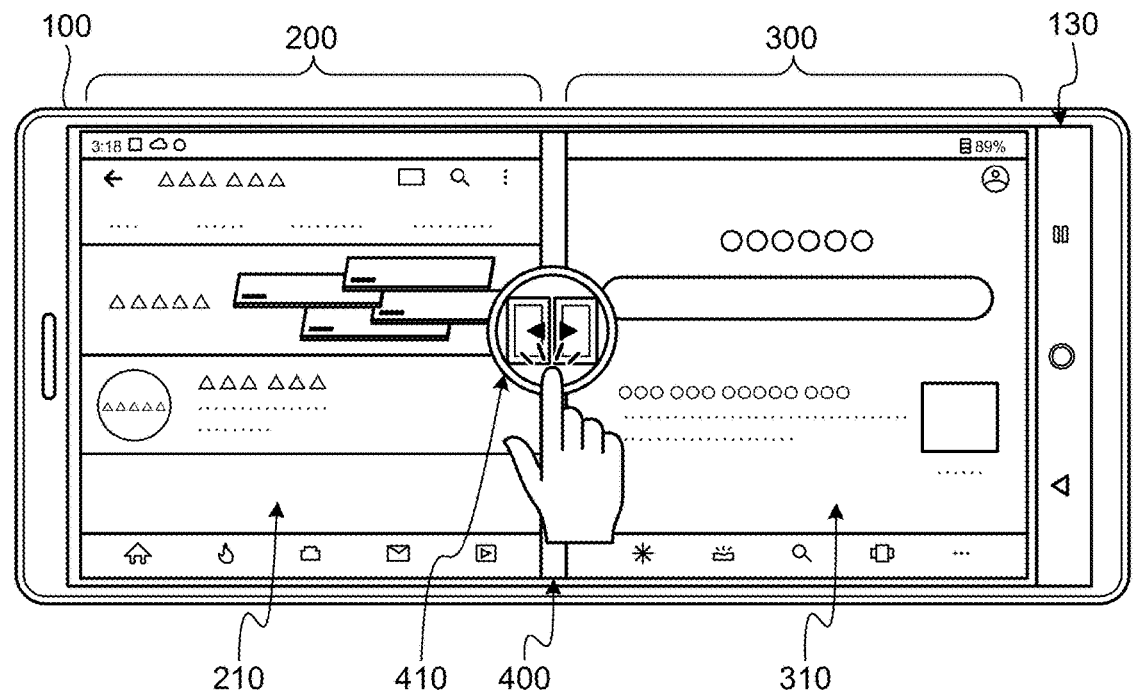
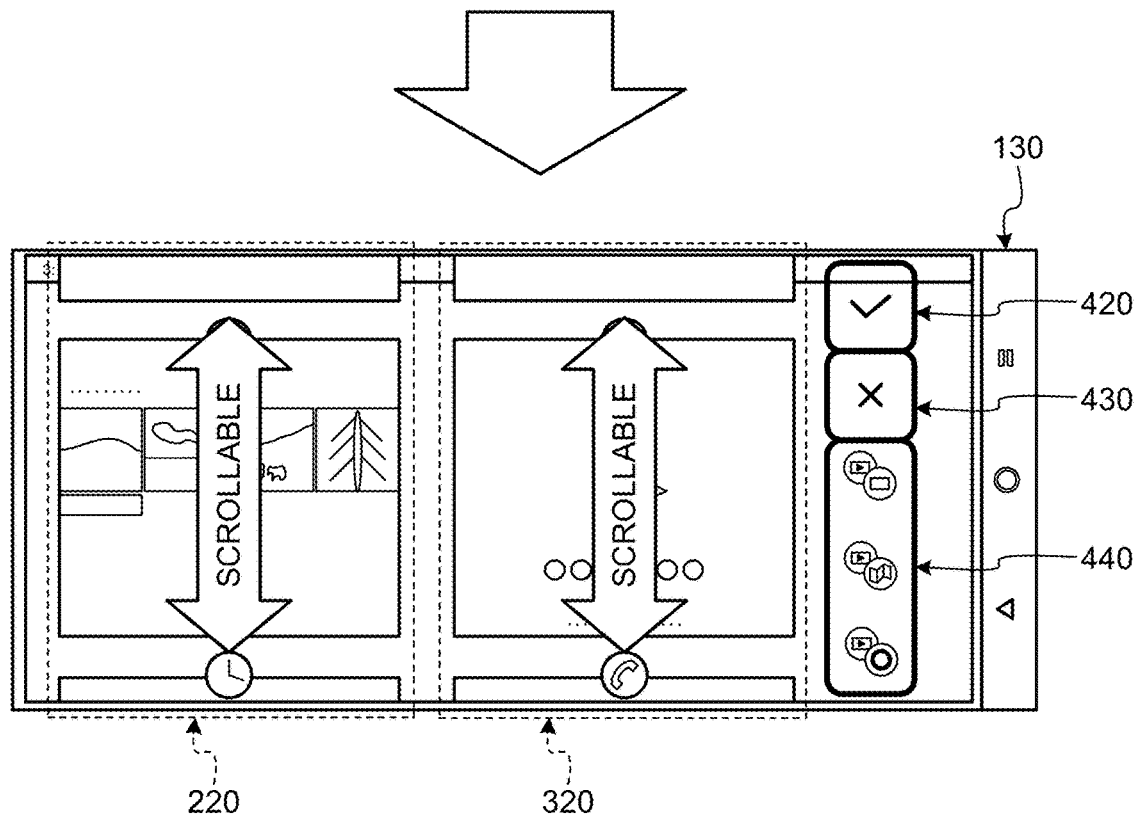

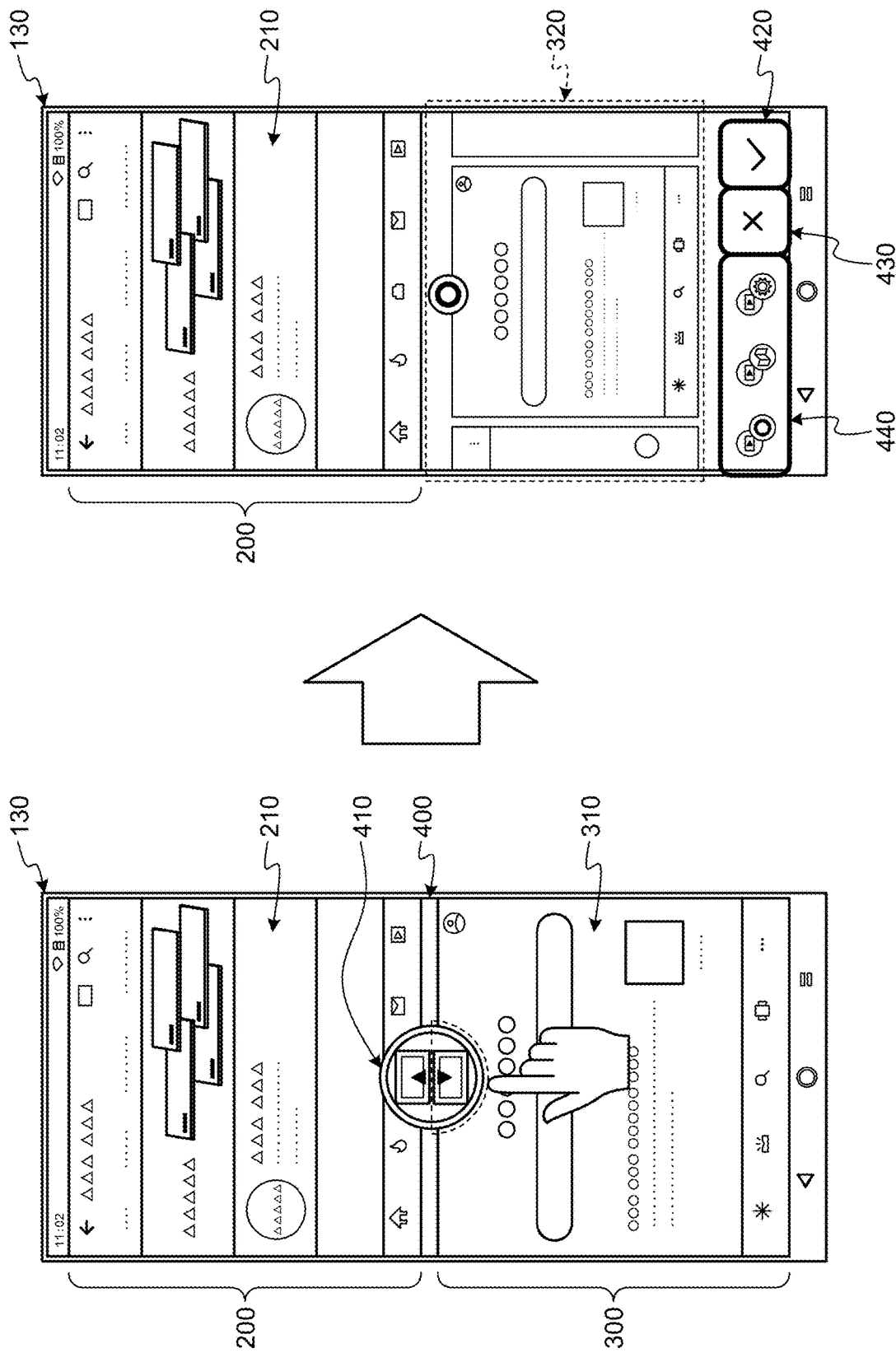

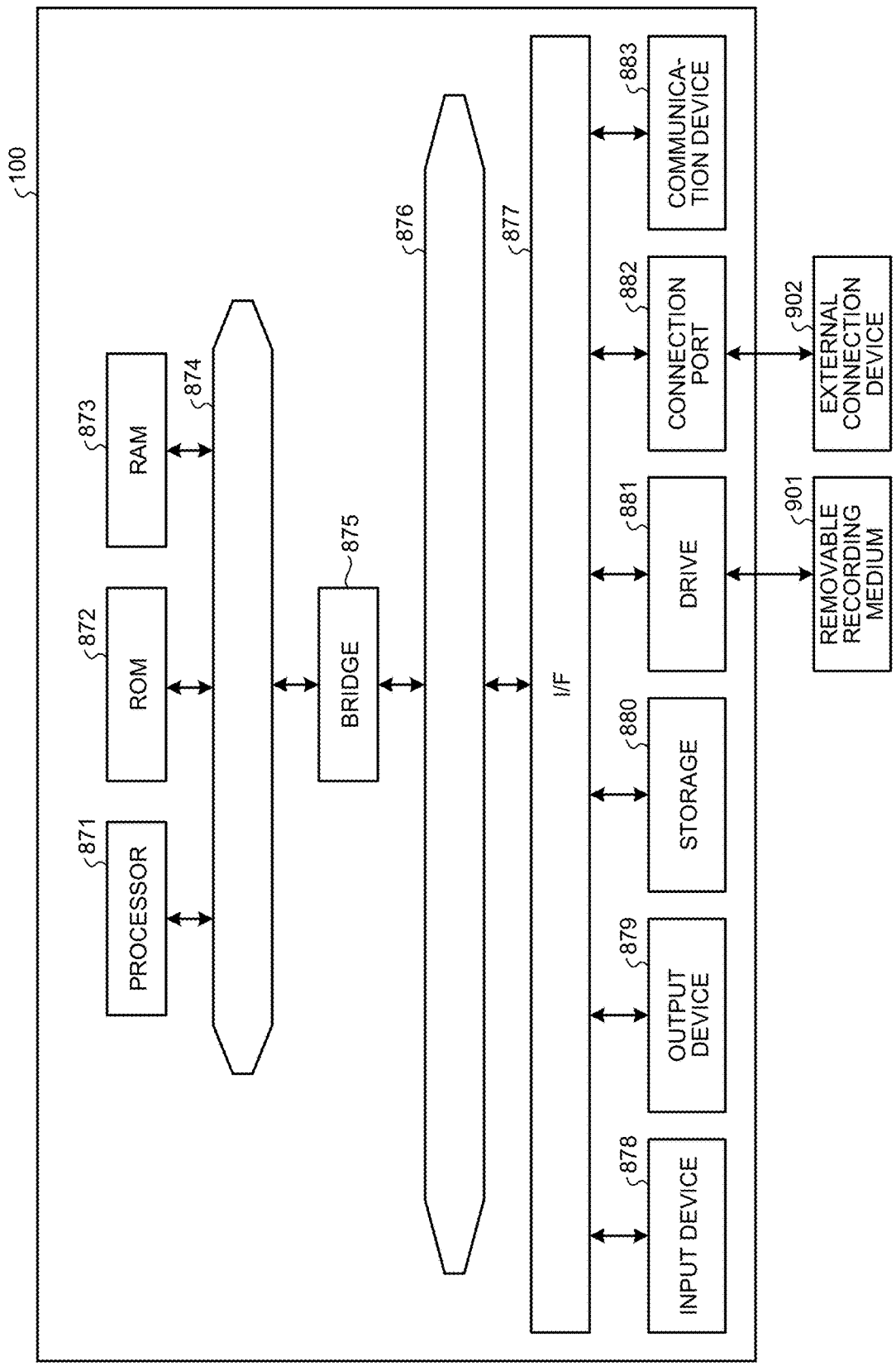

INFORMATION PROCESSING APPARATUS, PROGRAM, AND METHOD

CROSS-REFERENCE TO RELATED APPLICATIONS

The present application is based on PCT filing PCT/JP2020/007265, filed Feb. 21, 2020, the entire content of each is incorporated herein by reference.

FIELD

The present disclosure relates to an information processing apparatus, a program, and a method.

BACKGROUND

There is a multi-window function capable of simultaneously displaying and using a plurality of applications and tasks arranged in units of windows on a screen of an information processing apparatus such as a smartphone. This is a function that, for example, when the smartphone is used in a portrait mode (so-called vertical holding), two applications can be simultaneously displayed and used by splitting the display in upper and lower parts.

CITATION LIST

Patent Literature

Patent Literature 1: JP 2014-157466 A

SUMMARY

Technical Problem

However, in a conventional multi-window function, in a case where it is desired to switch an application to another application, only one application (a lower application in a case of upper and lower displays) can be switched. Therefore, for example, to switch an upper application in the upper and lower displays, it is necessary to release the multi-window function once, select the application to be switched, start the multi-window function, and select the lower application again, which lacks usability.

Therefore, the present disclosure proposes an information processing apparatus, a program, and a method that enable a user to freely switch multi-window applications without impairing usability.

Solution to Problem

The present disclosure proposes an information processing apparatus comprising, an operation unit configured to detect an operation by a user, and a control unit configured to control a display unit, wherein the control unit in response to detecting a first user operation, displays a first application list and a second application list on the display unit, in response to detecting a second user operation for selecting a first application from the first application list, displays the first application selected in a first window on the display unit, and in response to detecting a third user operation for selecting a second application from the second application list, displays the second application selected in a second window on the display unit.

The present disclosure proposes a program causing an information processing apparatus to implement, detecting an operation by a user, in response to detecting a first user operation, displaying a first application list and a second application list, in response to detecting a second user operation for selecting a first application from the first application list, displaying the first application selected in a first window, and in response to detecting a third user operation for selecting a second application from the second application list, displaying the second application selected in a second window.

The present disclosure proposes a method, by an information processing apparatus, comprising, detecting an operation by a user, in response to detecting a first user operation, displaying a first application list and a second application list, in response to detecting a second user operation for selecting a first application from the first application list, displaying the first application selected in a first window, and in response to detecting a third user operation for selecting a second application from the second application list, displaying the second application selected in a second window.

BRIEF DESCRIPTION OF DRAWINGS

FIG. 3 is a diagram illustrating an example of an icon 410 for displaying an application list according to the present embodiment.

FIG. 4 is a diagram illustrating an example of a display position change of the icon 410 for displaying the application list according to the present embodiment.

FIG. 5 is a diagram illustrating an example of an application list for application switching according to the present embodiment.

FIG. 6 is a diagram illustrating an example of an application search for application switching according to the present embodiment.

FIG. 10 is a diagram illustrating an example of application switching in a landscape mode according to the present embodiment.

FIG. 11 is a diagram illustrating modification of application switching according to the present embodiment.

FIG. 12 is a block diagram illustrating a hardware configuration example of the information processing apparatus 100 according to the present embodiment.

DESCRIPTION OF EMBODIMENTS

Figure 1:
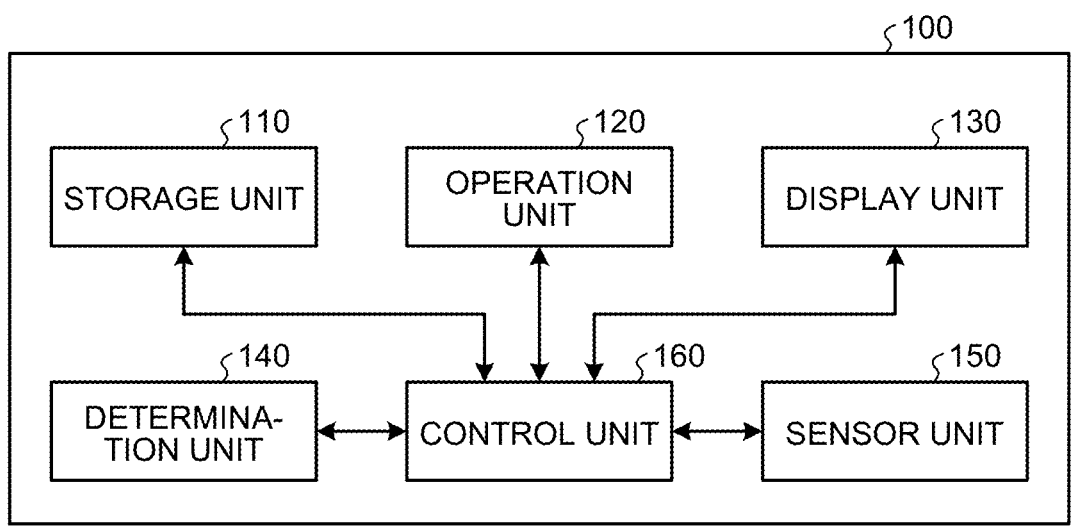
FIG. 1 is a block diagram illustrating a functional configuration example of an information processing apparatus 100 according to a present embodiment.

Hereinafter, embodiments of the present disclosure will be described with reference to the drawings. Note that, in the present specification and the drawings, substantially the same parts are given by the same reference signs to omit duplicate description.

The description will be given in the following order.

1. Embodiment
1.1. Functional configuration example
1.2. Details of functions
2. Modifications of embodiment
2.1. First modification
2.2. Second modification
3. Hardware configuration example
4. Summary

1. Embodiment

1.1. Functional Configuration Example

First, an information processing apparatus 100 according to the present embodiment will be described. The information processing apparatus 100 is an apparatus provided with a touch panel display and a multi-window function, and may be, for example, a mobile terminal such as a smartphone or a tablet personal computer (PC).

FIG. 1 is a block diagram illustrating a functional configuration example of the information processing apparatus 100 according to the present embodiment. As illustrated in FIG. 1, the information processing apparatus 100 according to the present embodiment includes a storage unit 110, an operation unit 120, a display unit 130, a determination unit 140, a sensor unit 150, and a control unit 160.

Storage Unit 110

The storage unit 110 according to the present embodiment is a storage area for temporarily or permanently storing various programs and data. For example, the storage unit 110 may store programs and data for the information processing apparatus 100 to execute various functions. As a specific example, the storage unit 110 may store programs for executing various applications, management data for managing content of an application list for application switching, a display position of an icon for displaying the application list, and various settings. Obviously, the above is merely an example, and types of data stored in the storage unit 110 are not particularly limited.

Operation Unit 120

The operation unit 120 according to the present embodiment detects various operations by user (user operations), such as an operation of apparatus with respect to an application or the application list. Specifically, the user operation includes an operation for displaying the application list (corresponding to a "first user operation"), an operation for selecting an application from the application list (corresponding to a "second user operation" and a "third user operation"), an operation for displaying an operation area (e.g., an icon for displaying the application list) to perform the first user operation (corresponding to a "fourth user operation"), and an operation for moving a position of the operation area (corresponding to a "fifth user operation"). In addition, the operation unit 120 controls an operation such as selection of an application from the application list so that the same application is not displayed in the multiple windows (e.g., even when an operation is performed, the operation is not accepted.).

Note that the operation of apparatus detected by the operation unit 120 includes a touch operation. Here, the touch operation includes various contact operations on the display unit 130 such as a tap, a double tap, a long tap, a swipe, a flick, a pinch, a drag, and a multi-tap. In addition, the touch operation includes, for example, a non-contact operation of bringing an object such as a finger close to the display unit 130. Therefore, the operation unit 120 is provided with, for example, a touch panel, a button, a keyboard, a mouse, and a proximity sensor.

Display Unit 130

The display unit 130 according to the present embodiment displays various types of visual information based on control by the control unit 160. Specifically, the display unit 130 displays the application list to be displayed in each window of the multiple windows. In addition, when an application is selected from the application list, the display unit 130 displays the selected application in a corresponding window. Furthermore, the display unit 130 displays an operation area for performing an operation of displaying the application list. Therefore, the display unit 130 is provided with various display devices such as a liquid crystal display (LCD) device and an organic light emitting diode (OLED) display device.

Determination Unit 140

The determination unit 140 according to the present embodiment determines whether or not an application selected from the application list is the same as another application selected from the application list so that the same application is not displayed in the multiple windows. Note that the determination unit 140 is, for example, a processor, and may be integrated with or separated from the control unit 160 described later.

Sensor Unit 150

The sensor unit 150 according to the present embodiment collects sensor information regarding user's behavior using various sensors. The sensor unit 150 is provided with, for example, an acceleration sensor, a gyro sensor, a geomagnetic sensor, a vibration sensor, and a global navigation satellite system (GNSS) signal receiver. For example, the sensor unit 150 detects, by the gyro sensor, that the user has changed the information processing apparatus 100 from a portrait mode (vertical holding) to a landscape mode (horizontal holding), or vice versa. Furthermore, in order to control what is displayed in the application list, the sensor unit 150 receives position information of the information processing apparatus 100 as a GNSS signal from a GNSS positioning satellite.

Control Unit 160

The control unit 160 according to the present embodiment is a processing unit that controls the entire information processing apparatus 100, and controls each component included in the information processing apparatus 100. The control unit 160 is realized by, for example, a processor such as a central processing unit (CPU) or a micro processing unit (MPU). Note that the control unit 160 may be realized by an integrated circuit such as an application specific integrated circuit (ASIC) or a field programmable gate array (FPGA). Any of the CPU, the MPU, the ASIC, and the FPGA can be regarded as a controller. Details of the functions of the control unit 160 according to the present embodiment will be described later.

The functional configuration example of the information processing apparatus 100 according to the present embodiment has been described above. Note that the functional configuration described above with reference to FIG. 1 is merely an example, and the functional configuration of the information processing apparatus 100 according to the present embodiment is not limited to such an example. For example, the information processing apparatus 100 may not necessarily include all of the configuration illustrated in FIG. 1, and a part of the configuration may be included in another apparatus different from the information processing apparatus 100. The functional configuration of the information processing apparatus 100 according to the present embodiment can be flexibly modified according to specifications and operations.

In addition, the function of each component may be performed by reading a control program from a storage medium such as a read only memory (ROM) or a random access memory (RAM) storing the control program in which a processing procedure for realizing these functions by an arithmetic device such as a CPU is stored, and then the program is interpreted and executed. Therefore, it is possible to appropriately change the configuration to be used according to a technical level at the time of carrying out the present embodiment. An example of a hardware configuration of the information processing apparatus 100 will be described later.

1.2. Details of Functions

Figure 2:
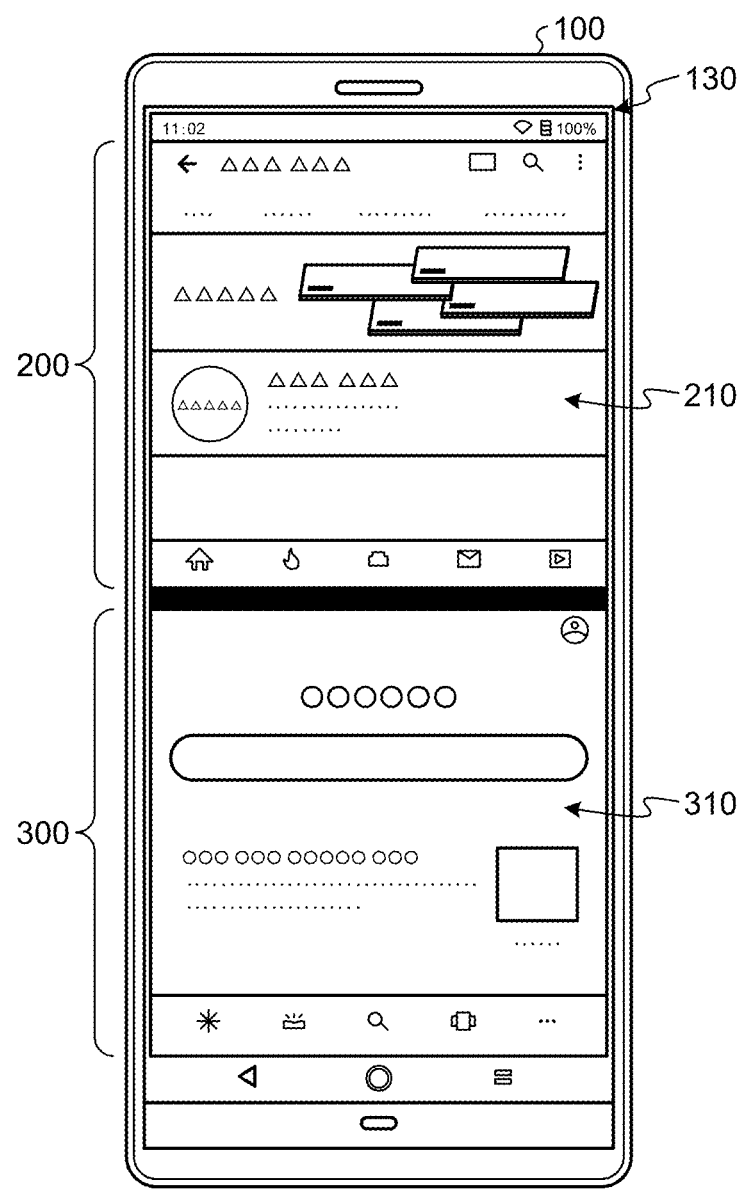
FIG. 2 is a diagram illustrating an example of a multi-window display in a portrait mode according to the present embodiment.

Next, functions of the information processing apparatus 100 according to the present embodiment will be described in detail. FIG. 2 is a diagram illustrating an example of a multi-window display in the portrait mode according to the present embodiment. As illustrated in FIG. 2, the information processing apparatus 100 has the multi-window function, and displays an application 210 and an application 310 in a first window 200 and a second window 300 that are predetermined display areas of the display unit 130, respectively. Note that, in the example in FIG. 2, two windows (the first window 200 and the second window 300) obtained by equally dividing the display unit 130 into two in the vertical direction are illustrated. However, in consideration of a case where the information processing apparatus 100 is a foldable phone (foldable smartphone) or the like, the position and the number of the boundary lines dividing the display unit 130, and the number of windows can be arbitrarily set.

Next, application switching in the multiple windows according to the present embodiment will be described with reference to FIGS. 3 to 8. First, the application list for finding an application to be switched to will be described. FIG. 3 is a diagram illustrating an example of an icon 410 for displaying the application list according to the present embodiment. As illustrated on the left side of FIG. 3, the user performs, for example, the tap operation on a boundary line 400 of the multi-windows (in a broken line in FIG. 3). Note that the position (area) at which the tap operation is performed and the operation are not limited to the example illustrated on the left side of FIG. 3. In particular, the tap operation may be another type of touch operation, an operation of a physical button or the like included in the information processing apparatus 100, or an operation by user's voice.

In response to the tap operation, the information processing apparatus 100 displays (activates) the icon 410 for displaying the application list as illustrated on the right side in FIG. 3. Note that the display position of the icon for displaying the application list is not limited to the position on the right side of FIG. 3, and can be arbitrarily changed as described later. Furthermore, the shape, size, and the like of the icon 410 are not limited to the example of FIG. 3.

Furthermore, the information processing apparatus 100 can bring the icon 410 into a non-display (inactive) state after the icon 410 has been displayed for a certain period of time. Alternatively, the information processing apparatus 100 may bring the icon 410 into the non-display state in response to a re-tap operation on the boundary line 400, a flick operation on the icon 410, or the like. In addition to the user operation, the information processing apparatus 100 can display the icon 410 in response to drawing or redrawing the first window 200 or the second window 300. Furthermore, the display position of the icon 410 in this case can also be arbitrarily changed.

FIG. 4 is a diagram illustrating an example of a display position change of the icon 410 for displaying the application list according to the present embodiment. As illustrated on the left side of FIG. 4, the user performs, for example, a drag operation on the icon 410. Then, as illustrated on the right side of FIG. 4, the user can change the display position of the icon 410 by dragging the icon 410 to move the icon 410 to an arbitrary position and then performing a drop operation. The information processing apparatus 100 can store the changed display position and display the icon 410 at the stored display position when displaying the icon next time. Note that, in the example on the right side of FIG. 4, the icon 410 is merely moved in the horizontal direction, but the user can move the icon 410 to an arbitrary position to change the display position.

FIG. 5 is a diagram illustrating an example of the application list for application switching according to the present embodiment. As illustrated on the left side of FIG. 5, the user performs the tap operation or the like on the icon 410. Then, as illustrated on the right side of FIG. 5, in response to the tap operation or the like on the icon 410, the information processing apparatus 100 displays a first application list 220 and a second application list 320, an enter button 420, a cancel button 430, and a shortcut button 440. The enter button 420, the cancel button 430, and the shortcut button 440 will be described in different drawings.

The first application list 220 and the second application list 320 are lists for switching applications (in the example in FIG. 5, the application 210 and the application 310) in the first window 200 and the second window 300, respectively.

As illustrated on the right side of FIG. 5, in the first application list 220, candidate applications to be displayed in the first window 200 are displayed, for example, in a side-by-side thumbnail format. In addition, the first application list 220 can be scrolled horizontally by a swiping operation or the like, and the user searches for an application to be displayed in the first window 200 while scrolling the first application list 220. The same applies to the case of displaying the second application list 320.

The information processing apparatus 100 can display only applications supporting multiple windows in the first application list 220 and the second application list 320. As a result, a problem that the user selects an application that does not support multiple windows displayed in the application list, as in the conventional multi-window function, will not occur. Note that the information processing apparatus 100 can determine whether or not an application supports multiple windows based on an internal flag of each application.

In addition, the information processing apparatus 100 can preferentially display applications that the user has recently used in the first application list 220 and the second application list 320. Here, a preferential display in the application list means, for example, displaying at a position in the application list that requires only a small width of scroll. Alternatively, the preferential display in the application list means, for example, displaying the applications in the application list in a case where the number of applications to be displayed in the application list is limited.

Furthermore, the information processing apparatus 100 can display each application in the first application list 220 and the second application list 320 regardless of the use frequency of each application.

Furthermore, the information processing apparatus 100 can determine applications to be displayed in the application list based on the use history in each window. For example, the information processing apparatus 100 stores the use history of each application in the first window 200, and can preferentially display applications having a high use frequency in the first window 200 in the first application list 220. The same applies to the case of displaying the second application list 320.

Furthermore, the information processing apparatus 100 can determine applications to be displayed in the first application list 220 and the second application list 320 based on at least one of the current time, the position information of the information processing apparatus 100, and the logged-in user. Specifically, for example, the use scene (business information search, private video viewing, etc.) of the information processing apparatus 100 can be estimated from the current time and the position information in order to determine applications to be displayed in each application list. Furthermore, in a case where the information processing apparatus 100 is shared by a plurality of persons such as family members, applications to be displayed in each application list can be determined by the logged-in user.

Furthermore, the information processing apparatus 100 can determine applications to be displayed in the first application list 220 and the second application list 320 based on applications being displayed in the multiple windows. Specifically, for example, applications to be displayed in the first application list 220 can be determined based on the application 210 being displayed in the first window 200. This is because, for example, there are applications that are highly likely to be used after using a certain application due to the use tendency of the user. In this manner, it is possible to estimate applications to be displayed next from the currently displayed application and to preferentially display these applications in the application list. Therefore, the information processing apparatus 100 stores the use tendency (use order) of such applications so that the use tendency can be used for displaying the application list. The same applies to the case of displaying the second application list 320.

On the other hand, in consideration of the use tendency of the user, applications to be displayed in each application list can be determined based on the combination of the applications to be displayed in the first window 200 and the second window 300. Specifically, for example, applications to be displayed in the second application list 320 can be determined based on the application 210 being displayed in the first window 200. This is because, for example, there is a use pattern in which the user displays a browser application in the second window 300 and surfs the Internet while displaying a music application in the first window 200 and listening to music. Note that the important point here is that displaying the browser application in the second window 300 while displaying the music application in the first window 200, and displaying the music application in the second window 300 while displaying the browser application in the first window 200 provide the user completely different sense of use. Therefore, the information processing apparatus 100 can store a combination of applications simultaneously displayed in the first window 200 and the second window 300 including which window is used for displaying which application, and use the combination for displaying the application list.

Next, the use of the application list displayed for an application search to switch applications displayed in the multiple windows will be described. FIG. 6 is a diagram illustrating an example of the application search for application switching according to the present embodiment. The example in FIG. 6 illustrates that the first application list 220 is operated to switch the application in the first window 200. As illustrated on the left side of FIG. 6, the user performs, for example, the drag operation on the first application list 220. Next, as illustrated on the right side of FIG. 6, the user can scroll the first application list 220 by swiping the first application list 220 rightward, for example, to search for an application to be displayed in the first window 200. When the application desired to be displayed in the first window 200 is found, the user stops scrolling the first application list 220 so that the application desired to be displayed is displayed at the center of the first application list 220 and selected. The same applies to the case of the application search in the second application list 320.

Figure 7:
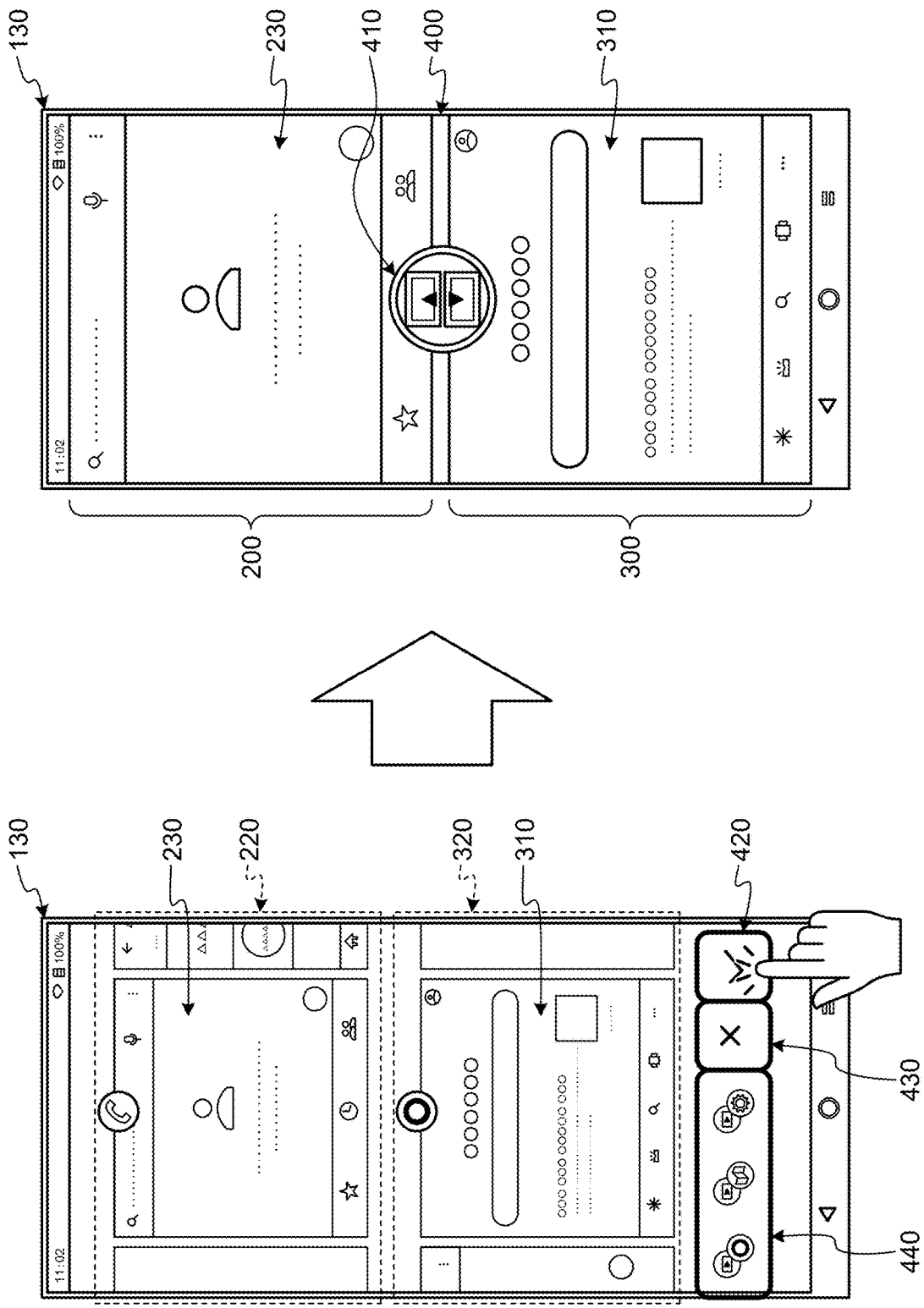
FIG. 7 is a diagram illustrating an example of application determination for application switching according to the present embodiment.

Next, determination of the application searched from the application list and display in a corresponding window will be described. FIG. 7 is a diagram illustrating an example of application determination for application switching according to the present embodiment. The example in FIG. 7 is a continuation from the example in FIG. 6, and the left side of FIG. 7 indicates that the user has selected the application 230 from the first application list 220 as the application to be displayed in the first window 200. Note that, in the second application list 320, the application 310 previously displayed in the second window 300 remains selected.

As illustrated on the left side of FIG. 7, the user performs the tap operation or the like on the enter button 420. Then, as illustrated on the right side of FIG. 7, the information processing apparatus 100 displays the application 230 and the application 310 selected from the first application list 220 and the second application list 320 in the first window 200 and the second window 300, respectively, in response to the tap operation or the like on the enter button 420. As a result, an application is switched in the multiple windows. In addition to the tap operation of the enter button 420, for example, the application may be switched by a single tap operation or a double tap operation on the application 230 displayed in the first application list 220.

For example, when the single tap operation on the application 230 displayed in the first application list 220 is detected, the application 230 is displayed in the first window 200. At the same time, when the single tap operation on the application 230 displayed in the first application list 220 is detected, the application 310 selected at that time in the second application list 320 is displayed in the second window 300. Similarly, when the single tap operation on the application previously displayed in the second application list 320 is detected, the application 230 selected at that time in the first application list 220 is displayed in the first window 200. As described above, in a case where the application is switched by the single tap operation or the like on the application, applications to be displayed in the first window 200 and the second window 300 are determined in response to detection of the single tap operation or the like.

Alternatively, applications to be displayed in the first window 200 and the second window 300 may be determined when the single tap operation or the like is detected in both the application displayed in the first window 200 and the application displayed in the second window 300. In this case, for example, the user who has performed the single tap operation first on the application displayed in the first window 200 also needs to perform the single tap operation on the application displayed in the second window 300. In this case, the application may be switched first in the window in which a determination operation is detected first, or the applications displayed in both windows (the first window 200 and the second window 300) may be switched simultaneously after detecting the determination operation in the other window.

Strictly speaking, since the application 310 has been displayed immediately before in the second window 300, the application 310 is simply displayed continuously without being switched. However, this does not mean that the multi-window applications cannot be switched simultaneously. Therefore, when the user selects an application from each of the first application list 220 and the second application list 320 and performs the tap operation or the like on the enter button 420, it is possible to simultaneously switch the applications displayed in the first window 200 and the second window 300.

In addition, when the tap operation or the like is performed on the cancel button 430, a selected state of the applications in the first application list 220 and the second application list 320 is canceled to return to a former state (e.g., the state on the left side of FIG. 5) without switching the applications in the first window 200 and the second window 300.

When the tap operation or the like is performed on the shortcut button 440, each application in the first window 200 and the second window 300 is switched to a preset application. Applications switched by the shortcut button 440 may be set in advance by the user, or a combination of applications frequently used in the first window 200 and the second window 300 may be set by the information processing apparatus 100. Furthermore, as illustrated on the left side of FIG. 7, the information processing apparatus 100 can change an appearance of the shortcut button 440 to icons of a preset applications so that the user can visually grasp the applications to be switched. Note that, in the example on the left side of FIG. 7, three types of shortcut buttons 440 are displayed, but the number of types of shortcut buttons 440 is not limited to three, and may be more or less than three.

Next, restriction of applications determined from the application list will be described. In the multi-window function according to the present embodiment, it is possible to control not to display the same application simultaneously in each window. This is because many applications prohibit or do not recommend double activation. However, in consideration of user convenience and the like, control that allows simultaneous display of the same application in each window may be used.

Figure 8:
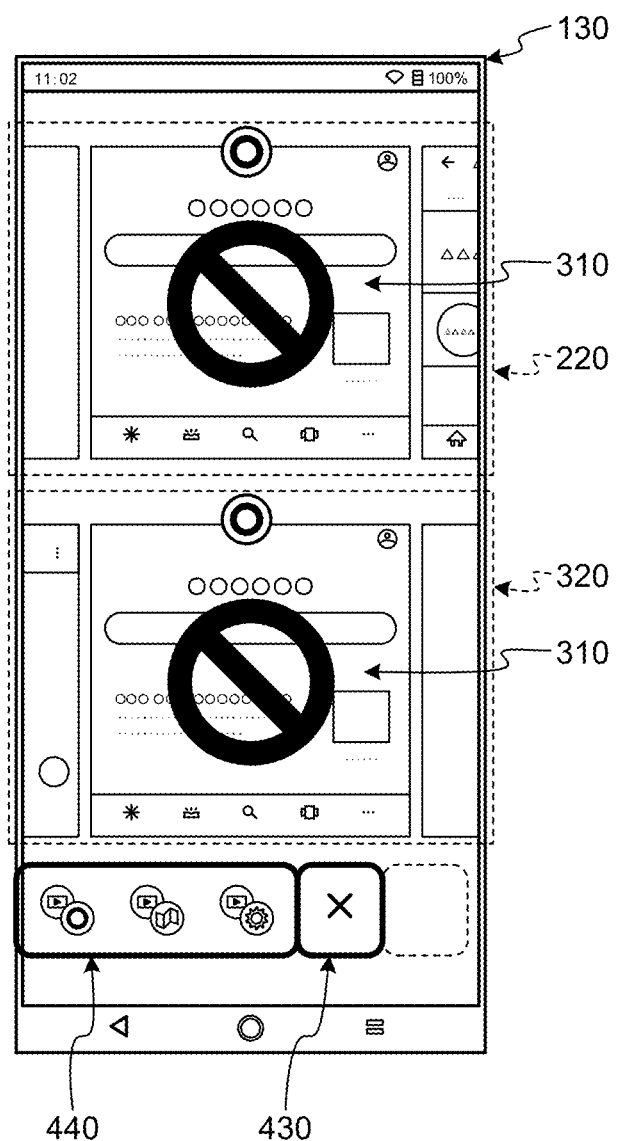
FIG. 8 is a diagram illustrating an example of operation control of the application determination for application switching according to the present embodiment.

FIG. 8 is a diagram illustrating an example of operation control of application determination for application switching according to the present embodiment. The example in FIG. 8 illustrates that the same application 310 is selected in the first application list 220 and the second application list 320. In this case, for example, as illustrated in FIG. 8, the enter button 420 may be hidden. In addition, a prohibition mark may be displayed on the display of the application 310 in each of the first application list 220 and the second application list 320, and the tap operation or the like may be disabled.

For example, as in the example in FIG. 8, in a case where it is detected that the same application is selected in the first application list 220 and the second application list 320, the enter button 420 is hidden. Furthermore, for example, when the same application is selected in the first application list 220 and the second application list 320, and also when the determination operation such as the single tap operation or the double tap operation by the user on the application 310 displayed in the first application list 220 or the second application list 320 is detected, it can be controlled that the above-described prohibition mark is displayed and the determination operation is disabled. Note that the display of the prohibition mark may be performed at the time of detecting that the same application is selected in the first application list 220 and the second application list 320. As a result, the information processing apparatus 100 can perform control so as not to accept the operation to determine the same application 310.

Multi-window application switching using the application list has been described with reference to FIGS. 3 to 8. However, depending on the number of applications, there may be an application that cannot be displayed in the application list, or it may be troublesome to find an application to be switched from the application list. Therefore, another example of the application list for application switching will be described.

Figure 9:
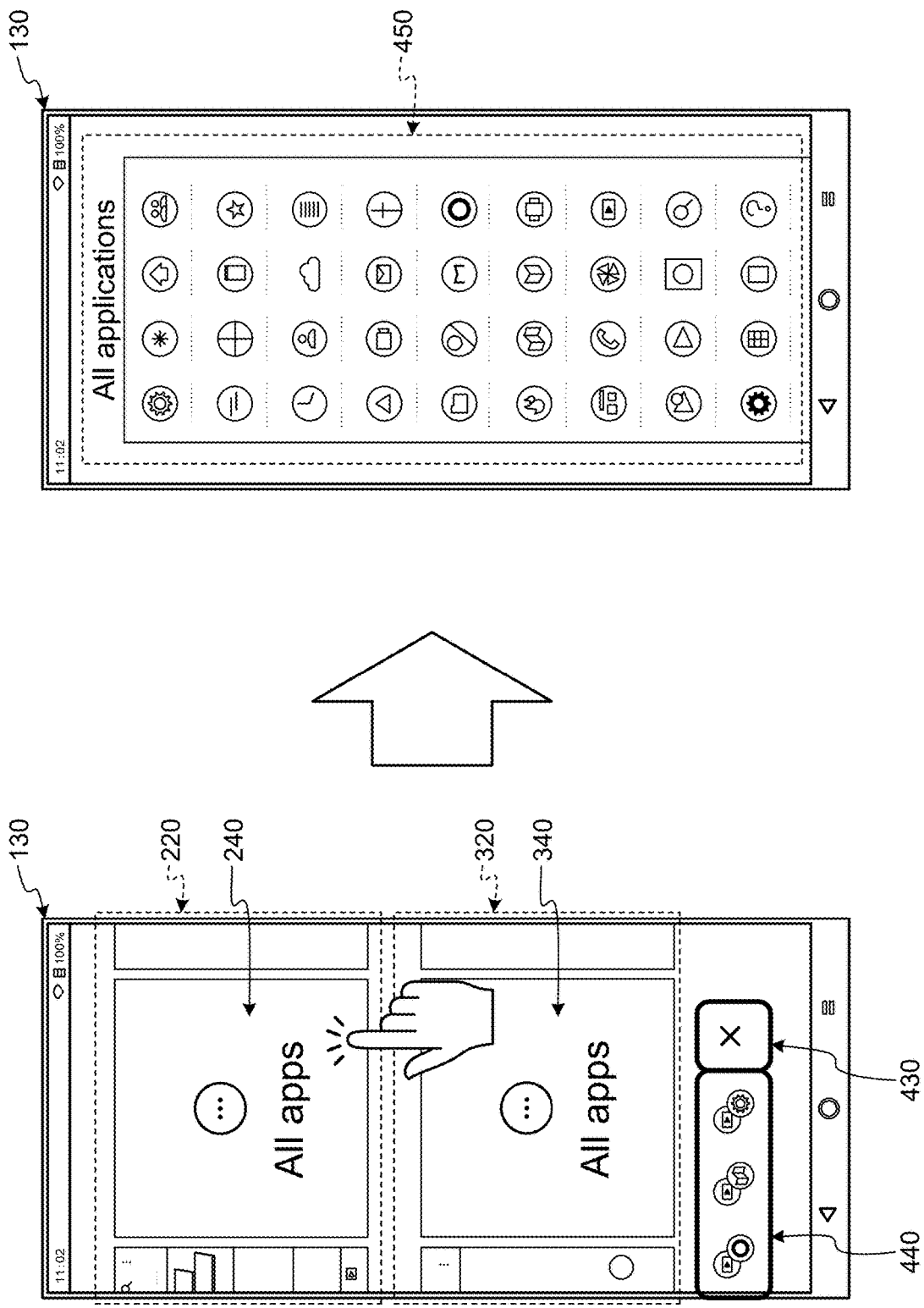
FIG. 9 is a diagram illustrating another example of the application list for application switching according to the present embodiment.

FIG. 9 is a diagram illustrating another example of the application list for application switching according to the present embodiment. As illustrated on the left side of FIG. 9, for example, a first operation area 240 and a second operation area 340 for displaying the application candidate list 450 including all applications can be displayed at both ends of the thumbnails displayed in the first application list 220 and the second application list 320.

As illustrated on the left side of FIG. 9, the user performs the tap operation or the like on the first operation area 240 or the second operation area 340. Then, as illustrated on the right side of FIG. 9, the information processing apparatus 100 can display the application candidate list 450 in response to the tap operation or the like on the first operation area 240 or the second operation area 340.

In the application candidate list 450, an icon of each application supporting multiple windows is displayed. An arrangement order of the icons in the application candidate list 450 may be the application name order or may be changed based on the user's use frequency or the like. Furthermore, depending on performance of the information processing apparatus 100 and the number of applications, the number of icons displayed in the application candidate list 450 may be limited or may be displayed in a plurality of pages.

The user selects an icon of an application to be displayed in each window from the application candidate list 450 by the tap operation or the like. In response to the tap operation or the like on the icon in the application candidate list 450, the information processing apparatus 100 displays the selected application in a corresponding window. Note that the corresponding window is the first window 200 when the application candidate list 450 is displayed in the first operation area 240, and is the second window 300 when the application candidate list 450 is displayed in the second operation area 340.

2. Modifications of Embodiment

2.1. First Modification

The application switching in the portrait mode according to the present embodiment has been described above. The application switching according to the present embodiment may also be realized in the landscape mode. FIG. 10 is a diagram illustrating an example of application switching in the landscape mode according to the present embodiment. FIG. 10 illustrates the example in which the information processing apparatus 100 is tilted leftward by 90 degrees from the portrait mode, and the application switching is performed in the landscape mode.

As illustrated in the upper part of FIG. 10, in the case of the landscape mode, the first window 200 and the second window 300 are displayed so as to divide the display unit 130 into two parts in the left-right direction. The user performs the tap operation or the like on the icon 410 in the similar manner to the operation in the portrait mode. Next, as illustrated in the lower part of FIG. 10, in response to the tap operation or the like on the icon 410, the information processing apparatus 100 displays the first application list 220, the second application list 320, and the like.

As illustrated in the lower part of FIG. 10, application candidates are displayed in a vertically aligned thumbnail format in the first application list 220 and the second application list 320 in the landscape mode. The first application list 220 and the second application list 320 can be scrolled vertically by a swiping operation or the like, and the user searches for an application to be displayed in the first window 200 or the second window 300 while scrolling each application list.

Note that, also in the landscape mode, behaviors of the icon 410, the enter button 420, the cancel button 430, and the shortcut button 440 are similar to those in the portrait mode.

2.2. Second Modification

When the application list is displayed by the multi-window function, depending on the type of application being displayed, the application may go into a pause state. For example, when the user is displaying a moving picture distribution application in one window of the multiple windows and viewing a moving picture, and also switches an application in another window, the moving picture may be paused, which lacks usability. Therefore, as modification of the present embodiment, a method of switching a target application while continuing the operation of the application that is not the switching target displayed in one of the multiple windows will be described.

FIG. 11 is a diagram illustrating the modification of application switching according to the present embodiment. As illustrated on the left side of FIG. 11, for example, the user performs, for example, the tap operation on a lower half of the icon 410. Then, as illustrated on the right side of FIG. 11, the information processing apparatus 100 displays the second application list 320 while continuing the operation of the application 210 being displayed in the first window 200. Then, the user searches for an application to be displayed in the second window 300 while scrolling the second application list 320. When the user performs the tap operation or the like on the enter button 420, the application of the second window 300 is switched. During this time, the operation of the application 210 being displayed in the first window 200 continues without being paused. Note that the application switching of the first window 200 can be executed similarly to the case of the second window 300 by performing the tap operation or the like on an upper half of the icon 410.

3. Hardware Configuration Example

Next, a hardware configuration example of the information processing apparatus 100 according to the embodiment of the present disclosure will be described. FIG. 12 is a block diagram illustrating the hardware configuration example of the information processing apparatus 100 according to the embodiment of the present disclosure. As illustrated in FIG. 12, the information processing apparatus 100 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of components may be omitted. In addition, components other than the components illustrated here may be further included.

Processor 871

The processor 871 functions as, for example, an arithmetic processing device or a control device, and controls the overall operation of each component or a part thereof according to various programs recorded in the ROM 872, the RAM 873, the storage 880, or a removable recording medium 901. Obviously, the processor 871 may be configured with a plurality of processors.

ROM 872, RAM 873

The ROM 872 is a unit that stores a program read by the processor 871, data used for calculation, and the like. The RAM 873 temporarily or permanently stores, for example, the program read by the processor 871, various parameters that change as appropriate when the program is executed, and the like.

Host bus 874, Bridge 875, External Bus 876, Interface 877

The processor 871, the ROM 872, and the RAM 873 are mutually connected via, for example, the host bus 874 capable of high-speed data transmission. On the other hand, for example, the host bus 874 is connected to the external bus 876 having a relatively low data transmission speed via the bridge 875. In addition, the external bus 876 is connected to various components via the interface 877.

Input Device 878

As the input device 878, for example, a mouse, a keyboard, a touch panel, a button, a switch, and a lever are used. Furthermore, as the input device 878, a remote control capable of transmitting a control signal using infrared rays or other radio waves may be used. Furthermore, the input device 878 includes a sound input device such as a microphone and a sensor device such as the acceleration sensor and the gyro sensor.

Output Device 879

The output device 879 is a device capable of visually or audibly notifying the user of acquired information including a display device such as a cathode ray tube (CRT), an LCD, or an organic EL, an audio output device such as a speaker or a headphone, a printer, a mobile phone, a facsimile, or the like. Furthermore, the output device 879 according to the present disclosure includes various vibration devices capable of outputting tactile stimulation.

Storage 880

The storage 880 is a device for storing various types of data. As the storage 880, for example, a magnetic storage device such as a hard disk drive (HDD), a semiconductor storage device, an optical storage device, or a magneto-optical storage device is used.

Drive 881

The drive 881 is, for example, a device that reads information recorded on the removable recording medium 901 such as a magnetic disk, an optical disk, a magneto-optical disk, or a semiconductor memory, or writes information to the removable recording medium 901.

Removable Recording Medium 901

The removable recording medium 901 is, for example, a DVD medium, a Blu-ray (registered trademark) medium, an HD DVD medium, or various semiconductor storage media. Naturally, the removable recording medium 901 may be, for example, an IC card on which a non-contact IC chip is mounted, or an electronic device.

Connection Port 882

The connection port 882 is a port for connecting an external connection device 902 such as a universal serial bus (USB) port, an IEEE 1394 port, a small computer system interface (SCSI), an RS-232 C port, or an optical audio terminal.

External Connection Device 902

The external connection device 902 is, for example, a printer, a portable music player, a digital camera, a digital video camera, or an IC recorder.

Communication Device 883

The communication device 883 is a communication device for connection to a network, and is, for example, a communication card for wired or wireless LAN, Bluetooth (registered trademark), or wireless USB (WUSB), a router for optical communication, a router for asymmetric digital subscriber line (ADSL), or a modem for various types of communication.

4. Summary

As described above, the information processing apparatus 100 includes the operation unit 120 that detects the operation by the user and the control unit 160 that controls the display unit 130. The control unit 160 displays the first application list 220 and the second application list 320 on the display unit 130 in response to detecting the first user operation, displays the selected first application in the first window 200 on the display unit 130 in response to detecting the second user operation for selecting the first application from the first application list 220, and displays the selected second application in the second window 300 on the display unit 130 in response to detecting the third user operation for selecting the second application from the second application list 320.

As a result, the user can freely switch applications displayed in the multiple windows without impairing usability.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. In other words, the technology according to the present disclosure can exhibit other effects obvious to those skilled in the art from the description of the present specification together with or instead of the above effects.

Note that the present technology can also have the following configurations.

REFERENCE SIGNS LIST

100 INFORMATION PROCESSING APPARATUS
110 STORAGE UNIT
120 OPERATION UNIT
130 DISPLAY UNIT
140 DETERMINATION UNIT
150 SENSOR UNIT
160 CONTROL UNIT

The invention claimed is:

1. An information processing apparatus comprising:
processing circuitry configured to
detect an operation by a user,
control a display,
in response to detecting a first user operation, display at least one of a first application list and a second application list on the display,
in response to detecting a second user operation for selecting a first application from the first application list, display the first application selected in a first window on the display,
in response to detecting a third user operation for selecting a second application from the second application list, display the second application selected in a second window on the display, and
display only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

2. The information processing apparatus according to claim 1, wherein the processing circuitry is further configured to display the first application list and the second application list in a scrollable thumbnail format.

3. The information processing apparatus according to claim 1, wherein the processing circuitry is further configured to display the first application list and the second application list in a list format.

4. The information processing apparatus according to claim 1, wherein the processing circuitry is further configured to display the first application list and the second application list regardless of a use frequency of each application.

5. The information processing apparatus according to claim 1, wherein the processing circuitry is further configured to
display the first application list based on a first use history in the first window, and
display the second application list based on a second use history in the second window.

6. The information processing apparatus according to claim 1, wherein the processing circuitry is further configured to display the first application list and the second application list based on at least one of a current time, position information of the information processing apparatus, and a logged-in user.

7. The information processing apparatus according to claim 1, wherein
the processing circuitry is further configured to
display the first application list based on a third application being displayed in the first window, and
display the second application list based on a fourth application being displayed in the second window.

8. The information processing apparatus according to claim 1, wherein
the processing circuitry is further configured to
display the second application list based on a third application being displayed in the first window, and
display the first application list based on a fourth application being displayed in the second window.

9. The information processing apparatus according to claim 1, wherein the processing circuitry is further configured to display an operation area for performing the first user operation at a predetermined position of the display in response to detecting a fourth user operation or drawing or redrawing of the first window or the second window.

10. The information processing apparatus according to claim 9, wherein the processing circuitry is further configured to display the operation area at a boundary between the first window and the second window in response to detecting the fourth user operation, the boundary being the predetermined position.

11. The information processing apparatus according to claim 9, wherein the processing circuitry is further configured to further hide the operation area after a lapse of a predetermined time from the operation area being displayed.

12. The information processing apparatus according to claim 9, wherein the processing circuitry is further configured to move the operation area to a first position on the display, display the operation area, and store the first position as the predetermined position in response to detecting a fifth user operation.

13. The information processing apparatus according to claim 1, wherein the processing circuitry is further configured to
in response to detecting the second user operation, determine whether the first application is same as a fourth application that is being selected from the second application list, and
in response to detecting the third user operation, determine whether the second application is same as a third application that is being selected from the first application list, wherein in response to determining that the first application is same as the fourth application, not to accept the second user operation, and
in response to determining that the second application is same as the third application, not to accept the third user operation.

14. The information processing apparatus according to claim 1, wherein the second user operation and the third user operation are a same operation or different operations.

15. An information processing apparatus comprising:
processing circuitry configured to
detect an operation by a user; and
control a display, wherein
in response to detecting a first user operation, display a first application list on the display,
in response to detecting a second user operation, display a second application list on the display,
in response to detecting a third user operation for selecting a first application from the first application list, display the first application selected in a first window on the display,
in response to detecting a fourth user operation for selecting a second application from the second application list, display the second application selected in a second window on the display,
even while the first application list is being displayed, continue to display a fourth application displayed in the second window without stopping the fourth application,
even while the second application list is being displayed, continue to display a third application displayed in the first window without stopping the third application, and
display only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

16. A non-transitory computer-readable storage medium causing an information processing apparatus to implement:
detecting an operation by a user;
in response to detecting a first user operation, displaying at least one of a first application list and a second application list;
in response to detecting a second user operation for selecting a first application from the first application list, displaying the first application selected in a first window;
in response to detecting a third user operation for selecting a second application from the second application list, displaying the second application selected in a second window; and
displaying only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

17. A method, by an information processing apparatus, comprising:
detecting an operation by a user;

in response to detecting a first user operation, displaying at least one of a first application list and a second application list;

in response to detecting a second user operation for selecting a first application from the first application list, displaying the first application selected in a first window;

in response to detecting a third user operation for selecting a second application from the second application list, displaying the second application selected in a second window; and displaying only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

18. A non-transitory computer-readable storage medium causing an information processing apparatus to implement:

detecting an operation by a user;

in response to detecting a first user operation, displaying a first application list;

in response to detecting a second user operation, displaying a second application list;

in response to detecting a third user operation for selecting a first application from the first application list, displaying the first application selected in a first window;

in response to detecting a fourth user operation for selecting a second application from the second application list, displaying the second application selected in a second window;

even while the first application list is being displayed, continuing to display a fourth application displayed in the second window without stopping the fourth application; and even while the second application list is being displayed, continuing to display a third application displayed in the first window without stopping the third application; and displaying only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

19. A method, by an information processing apparatus, comprising:

detecting an operation by a user;

in response to detecting a first user operation, displaying a first application list;

in response to detecting a second user operation, displaying a second application list;

in response to detecting a third user operation for selecting a first application from the first application list, displaying the first application selected in a first window;

in response to detecting a fourth user operation for selecting a second application from the second application list, displaying the second application selected in a second window;

even while the first application list is being displayed, continuing to display a fourth application displayed in the second window without stopping the fourth application;

even while the second application list is being displayed, continuing to display a third application displayed in the first window without stopping the third application; and displaying only an application supporting multiple windows in the first application list and the second application list based on an internal flag of each application that indicates whether the application has a capability to support multiple windows independent of any previous usage of the application, wherein an application that does not support multiple windows based on the internal flag is not displayed in the first application list and the second application list.

* * * * *